(12) United States Patent
Kirla (10) Patent No.: US 8,472,900 B2
(45) Date of Patent: Jun. 25, 2013

(54) METHOD AND SYSTEM FOR ENHANCING THE DISCONTINUOUS TRANSMISSION FUNCTIONALITY

(75) Inventor: Olli Kirla, Espoo (FI)

(73) Assignee: Nokia Corporation

( * ) Notice: Subject to any disclaimer, the term of this patent is extended or adjusted under 35 U.S.C. 154(b) by 2006 days.

(21) Appl. No.: 11/523,572

(22) Filed: Sep. 20, 2006

(65) Prior Publication Data
US 2008/0008298 A1    Jan. 10, 2008

(30) Foreign Application Priority Data
Jul. 7, 2006   (FI) .................................. 20060666

(51) Int. Cl.
*H01Q 11/12* (2006.01)
(52) U.S. Cl.
USPC ............................... 455/127.5; 379/88.03
(58) Field of Classification Search
USPC ................. 379/88.08, 88.01; 455/127.5
See application file for complete search history.

(56) References Cited

U.S. PATENT DOCUMENTS

| | | | | |
|---|---|---|---|---|
| 4,100,377 A | * | 7/1978 | Flanagan | 370/435 |
| 4,177,361 A | * | 12/1979 | Birck | 379/406.07 |
| 4,897,832 A | * | 1/1990 | Suzuki et al. | 370/287 |
| 5,371,787 A | * | 12/1994 | Hamilton | 379/386 |
| 6,108,410 A | * | 8/2000 | Reding et al. | 379/265.03 |
| 6,178,170 B1 | * | 1/2001 | Duree et al. | 370/395.61 |
| 6,243,568 B1 | * | 6/2001 | Detlef et al. | 455/226.4 |
| 6,304,648 B1 | * | 10/2001 | Chang | 379/202.01 |
| 6,424,637 B1 | * | 7/2002 | Pecen et al. | 370/328 |
| 6,427,006 B1 | * | 7/2002 | Reding et al. | 379/201.01 |
| 6,480,598 B1 | * | 11/2002 | Reding et al. | 379/265.01 |
| 6,490,556 B1 | * | 12/2002 | Graumann et al. | 704/233 |
| 6,510,409 B1 | * | 1/2003 | Su | 704/233 |
| 6,567,503 B2 | * | 5/2003 | Engelke et al. | 379/52 |
| 6,590,874 B1 | * | 7/2003 | Wang et al. | 370/318 |
| 6,718,303 B2 | * | 4/2004 | Tang et al. | 704/235 |
| 6,826,394 B1 | * | 11/2004 | Raith et al. | 455/404.2 |
| 7,072,828 B2 | * | 7/2006 | Petty | 704/210 |
| 7,194,071 B2 | * | 3/2007 | Rupsis | 379/88.16 |
| 7,203,199 B1 | * | 4/2007 | Duree et al. | 370/395.6 |
| 7,310,317 B2 | * | 12/2007 | Yepez et al. | 370/252 |
| 7,536,029 B2 | * | 5/2009 | Choi et al. | 382/103 |
| 7,606,359 B1 | * | 10/2009 | Reding et al. | 379/265.01 |
| 7,639,633 B2 | * | 12/2009 | Hollins et al. | 370/260 |
| 7,678,047 B2 | * | 3/2010 | Shiomi et al. | 600/300 |
| 2001/0005825 A1 | * | 6/2001 | Engelke et al. | 704/235 |

(Continued)

FOREIGN PATENT DOCUMENTS

| | | |
|---|---|---|
| EP | 1 460 824 A2 | 9/2004 |
| EP | 1 617 640 A1 | 1/2006 |
| GB | 2 332 598 A | 6/1999 |

OTHER PUBLICATIONS

International Search Report for International Application No. PCT/FI2007/050420 mailed Nov. 5, 2007.

(Continued)

*Primary Examiner* — Simon Sing
(74) *Attorney, Agent, or Firm* — Alston & Bird LLP (57) ABSTRACT

The invention allows improving the control of transmission of the silence detection (SID) frames to prevent annoying effects in the music sent to the calling terminal instead of ringback tones. This can be achieved by disabling the discontinuous transmission functionality during the period of call establishment. There are many different ways to accomplish the idea behind the present invention.

15 Claims, 6 Drawing Sheets

U.S. PATENT DOCUMENTS

| | | | |
|---|---|---|---|
| 2002/0069055 A1* | 6/2002 | Tang et al. | 704/235 |
| 2002/0165718 A1* | 11/2002 | Graumann et al. | 704/270 |
| 2003/0009337 A1* | 1/2003 | Rupsis | 704/260 |
| 2003/0212548 A1* | 11/2003 | Petty | 704/201 |
| 2004/0204168 A1* | 10/2004 | Laurila | 455/569.1 |
| 2005/0065412 A1* | 3/2005 | Shiomi et al. | 600/300 |
| 2005/0186964 A1* | 8/2005 | Aikawa et al. | 455/452.2 |
| 2006/0053009 A1* | 3/2006 | Jeong et al. | 704/234 |
| 2006/0075422 A1* | 4/2006 | Choi et al. | 725/18 |
| 2006/0126539 A1* | 6/2006 | Hollins et al. | 370/260 |
| 2008/0137558 A1* | 6/2008 | Baird | 370/260 |
| 2009/0119103 A1* | 5/2009 | Gerl et al. | 704/243 |

OTHER PUBLICATIONS

Technical Specification Entitled "3GPP TS 23.205 V5.12.0 (Jun. 2006); $3^{rd}$ Generation Partnership Project; Technical Specification Group Core Network and Terminals; Bearer-independent circuit-switched core network; Stage 2 (Release 5)"; 220 pages.

First Office Action for Application No. CN 200780020372.9 dated Mar. 9, 2010.

Office Action from parallel Korean Application No. 10-2008-7029810 dated Oct. 27, 2010.

Machine Translation of Office Action from parallel Korean Application No. 10-2008-7029810 dated Oct. 27, 2010.

* cited by examiner

METHOD AND SYSTEM FOR ENHANCING THE DISCONTINUOUS TRANSMISSION FUNCTIONALITY

FIELD OF THE INVENTION

The invention relates to speech coding in a telecommunication networks. Especially the present invention relates to a novel and innovative method and system increasing the quality of the music or other audio signals sent to the calling terminal instead of ringback tones.

BACKGROUND OF THE INVENTION

Low bit-rate speech codecs have usually a discontinuous transmission (DTX) functionality to decrease bit-rate or channel activity over the transmission channel. The DTX functionality uses a voice activity detector (VAD) prior speech encoder to detect speech pauses from active speech bursts. During speech pauses typically only a level and spectral information are encoded as silence description (SID) frames or comfort noise frames are used to be sent and these contribute a much lower bit-rate over the channel. In a radio channel, reduced bit rate enables more capacity or better transmission quality due to less radio interference. In packet based transmission systems (e.g. ATM or IP radio access or core network transmission), the DTX enables more transmission capacity due to a statistical multiplexing phenomenon when speech pauses of multiple calls equalize the gross bit-rate over a fast bit-rate packed based transmission channel.

Due to the previous reasons, the DTX functionality is a key feature of speech communication systems that are using a radio or packet transmission media. Therefore the DTX is widely used in cellular and VoIP networks.

The voice activity detector has a key role in determining whether speech or pause is present at the input of speech encoder. Misclassifications by the VAD lead to either a loss of actual speech if speech is classified as a pause or a too high channel activity if a pause is classified as an active speech.

In addition to the basic speech vs. pause classification, the VAD should detect properly certain special audio signals. It is desirable that information tones, e.g. ringing and busy tones, are not detected as a speech pause or as background noise. This requirement differs from the basic VAD functionality because both background noise during speech pauses and information tones are typically very stationary. Therefore the basic VAD would easily classify both signals as background noise. Typically VAD has an additional tone detection functionality to ensure that information tones are transmitted continuously over the channel.

Another special audio signal, that VAD has to detect properly, is music. It is necessary to detect music signals correctly and not to allow SID frames to be sent over the channel during the whole duration of music. It is undesirable that a part of music is detected as a pause or background noise. This behavior results in a temporal clipping of music or a part of the music sequence can be replaced with high level comfort noise. The latter phenomenon may generate annoying noise bursts into the middle of music sequence. State-of-the-art VADs have some kind of music detector to circumvent this problem.

However as the world is full of different music styles and pieces, it is impossible to design an in-band detector that always would detect music from background noise. Therefore there is an increased risk that VAD makes misclassifications and annoying sound effects are heard by the end users while listening to music from the terminal.

Especially the music detection problem may be crucial for a new added-value feature called "caller tunes" or "personalized ringback tone". In this feature, the conventional ringing tone (ringback tone) sent back to the caller terminal has been replaced with real music. This feature has been used as an extra service by cellular operators. It is clear that an absolutely robust method for the music detection is required for this application. Conventional in-band music detectors to be used together with the DTX are typically not robust enough. As the system is not reliable enough because of this suboptimal performance, the DTX functionality must either be disabled from the network or not to provide caller tunes feature. The first option would of course affect negatively the network capacity. The latter would prevent a new business opportunity. So, there is a clear need to improve the music detection capability of DTX functionality, which should overcome the above mentioned problems, for example, when music is applied instead of ringback tone.

Some speech codecs, e.g. AMR (Adaptive multirate), have built-in music detectors. However, it has been found that built-in music detector may be unable to detect music correctly in all circumstances. Therefore, there is a need to find further ways to address the above described problem. It may be advantageous for this purpose to find alternative approaches than developing music detection systems.

PURPOSE OF THE INVENTION

The purpose of the invention is to attempt to solve above mentioned problems. Especially the purpose of the present invention is to present a new and innovative method and system for speech coding systems in the telecommunication networks to make it possible to use music or any other audio signal to substitute ringback tones, for example. Furthermore the purpose of the present invention is to diminish the problems caused by the poor quality of the music detection in the speech coding systems. This may also enable to use DTX systems together with the speech coding systems in all circumstances.

SUMMARY OF THE INVENTION

It is therefore a primary objective of the present invention to improve the control of transmission of the silence detection (SID) frames to prevent annoying effects in the music sent to the calling terminal instead of ringback tones. This objective can be achieved by disabling the discontinuous transmission functionality during the period of call establishment. There are many different ways to accomplish the idea behind the present invention.

A first aspect of the present invention is a method in which discontinuous transmission functionality is used to control a transmission of the silence description frames during the call setup procedure. Then, said discontinuous transmission functionality is disabled until the called terminal answers. The moment of answer of the called terminal is detected from the signalling of said call setup procedure and based on this said discontinuous transmission functionality is enabled after the called terminal has answered.

A second aspect of the present invention is an apparatus which is configured to disable a discontinuous transmission functionality to control a transmission of the silence description frames. The system of the second aspect is further configured to disable said discontinuous transmission functionality until the called terminal answers and to enable said discontinuous transmission functionality after the called terminal has answered.

The third aspect of the present invention is an apparatus which comprises means for disabling said discontinuous transmission functionality until a moment of answer of a called terminal and means for enabling said discontinuous transmission functionality in response to detecting the moment of answer of the called terminal.

The fourth aspect of the present invention is a computer program embodied on a computer readable medium, the computer program controlling a data-processing device to perform the steps of:

disabling a discontinuous transmission functionality controlling a transmission of silence description frames until a moment of answer of a called terminal;

detecting the moment of answer of the called terminal from signalling of a call setup procedure; and enabling said discontinuous transmission functionality in response to detecting the moment of answer of the called terminal.

The benefit of the present invention is that it ensures that music or ringback tone is never clipped by the DTX during the alert phase of call setup. Furthermore it is advantageous that the invention is independent of used speech codec, whereas the current in-band music detectors are implemented individually for each codec. Also the accomplishment of the present invention does not require any additional resources from the transcoder entity.

The implementation of the present invention is relatively straightforward and easy as the idea is based on the current Layer 3 or Multimedia Gateway (MGW) control signalling messages and there are no additional messages needed for MSC Server (MSS) implementation.

The invention can be applied to all speech access technologies that are currently available, including GSM, WCDMA, IMS, FSS and UMA, as well as any future speech communication technology.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

Figure 1:
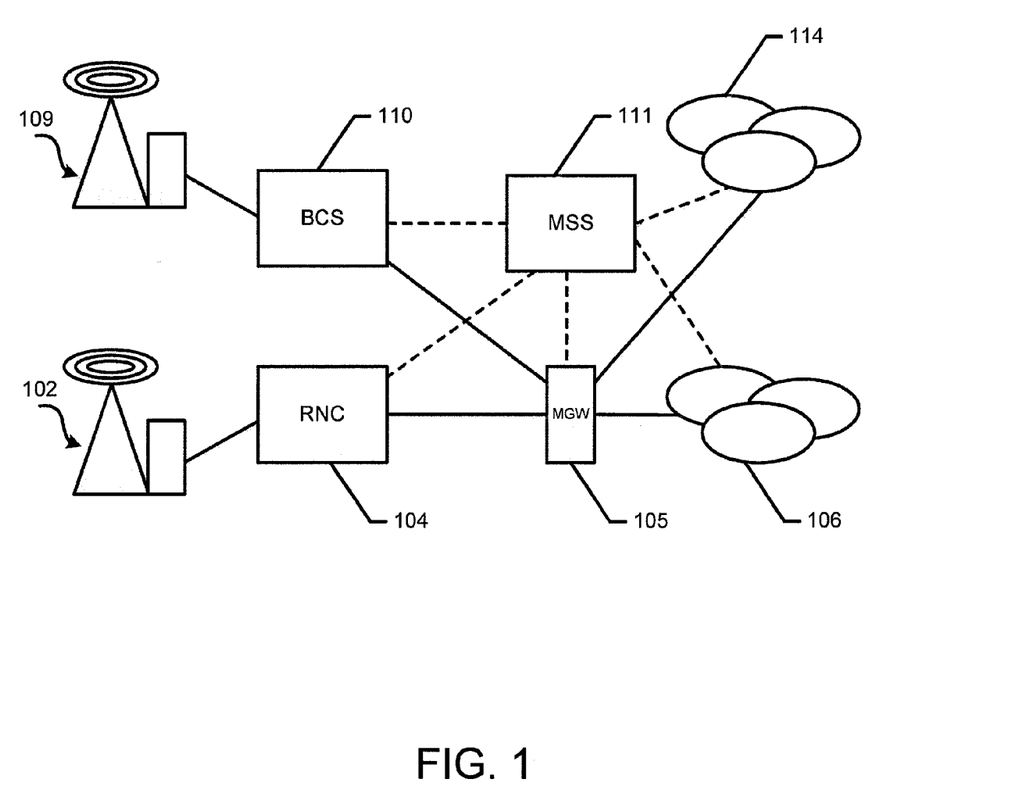
FIG. 1 is a diagram describing an exemplary embodiment according to the present invention.

FIG. 1 illustrates a system according to an embodiment of the present invention. In figure there are presented two mobile networks according to two different standards. Connections towards these two networks can be established via either A interface or Iu interface. Dashed line in FIG. 1 means signalling and solid line user plane. These networks are presented to explain the essential network elements. A GSM network, above in FIG. 1, is composed of several functional entities, whose functions and interfaces are specified.

The GSM network can be divided into three broad parts. The mobile station, which is not shown in FIG. 1 is carried by the subscriber. The Base Station Subsystem (BSS) including base transceiver station (BTS) 109 and base station controller (BSC) 110 controls the radio link with the mobile station MS. The BSS also includes a transcoder (TC) entity to carry out speech transcoding functions. The transcoder either resides in the BSC 110 or remotely at the Multimedia Gateway 105. The MSC Server System is independent of the transmission backbone and is specified in the 3G Partnership Program's Release 4 specifications (3GPP Rel4). It separates call control and signalling (control plane) and traffic (user plane) into separate network elements. The MSC Server (MSS) 111 handles call control and signalling, while the Multimedia Gateway (MGW) 105 takes care of switching and carries the actual traffic. MSC Server 111 is further connected to PSTN/ISDN 114 network through certain network entities which are not shown in FIG. 1.

A WCDMA network part, below in FIG. 1, includes also a base station 102, called Node B, and radio network controller (RNC) 104. The RNC is the governing element in the WCDMA radio access network (UTRAN) responsible for control of Node-B's, that is to say the base stations which are connected to the controller. The RNC 104 carries out radio resource management, some of the mobility management functions and is the point where encryption is done before user data is sent to and from the mobile. The RNC 104 connects to the circuit switched core network through media gateway (MGW). Media gateway 105 is a network element that together with MSC Server 111 forms the MSC server system. It takes care of switching and carries the actual traffic and performs, if necessary, transcodings and media adaptation and may be connected to IP/ATM/TDM Backbone 106, as well as IP based IMS, FSS and UMA networks. Media gateway functionality is defined in 3GPP Release 4 and later specifications.

Figure 2:
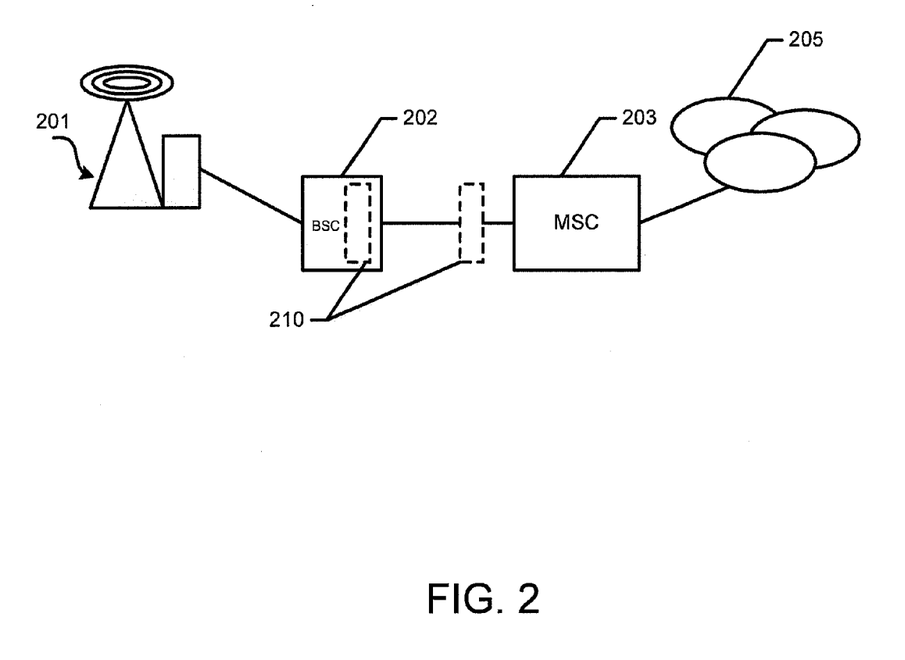
FIG. 2 is a diagram describing another exemplary embodiment according to the present invention.

One example of the possible network architectures, in which the invention could be exploited is presented in FIG. 2. This architecture is specified in 3GPP Release 99 and older specifications. The mobile services switching center (MSC) 203 performs the switching of calls between the mobile users, and between mobile and fixed network users. The MSC 203 also handles the mobility management operations. The mobile station and the base station subsystem (BSS) including the base transceiver station (BTS) 201 and the base station controller (BSC) 202 communicate across the Um interface, also known as the air interface or radio link. The base station subsystem communicates with the mobile services switching center 203 across the A interface. Transcoder 210 belongs logically to the BSS, although it can locate remotely at the MSC 203. In FIG. 2 transcoder 210 is presented as being located either in BSS or in connection with MSC 203.

Figure 3:
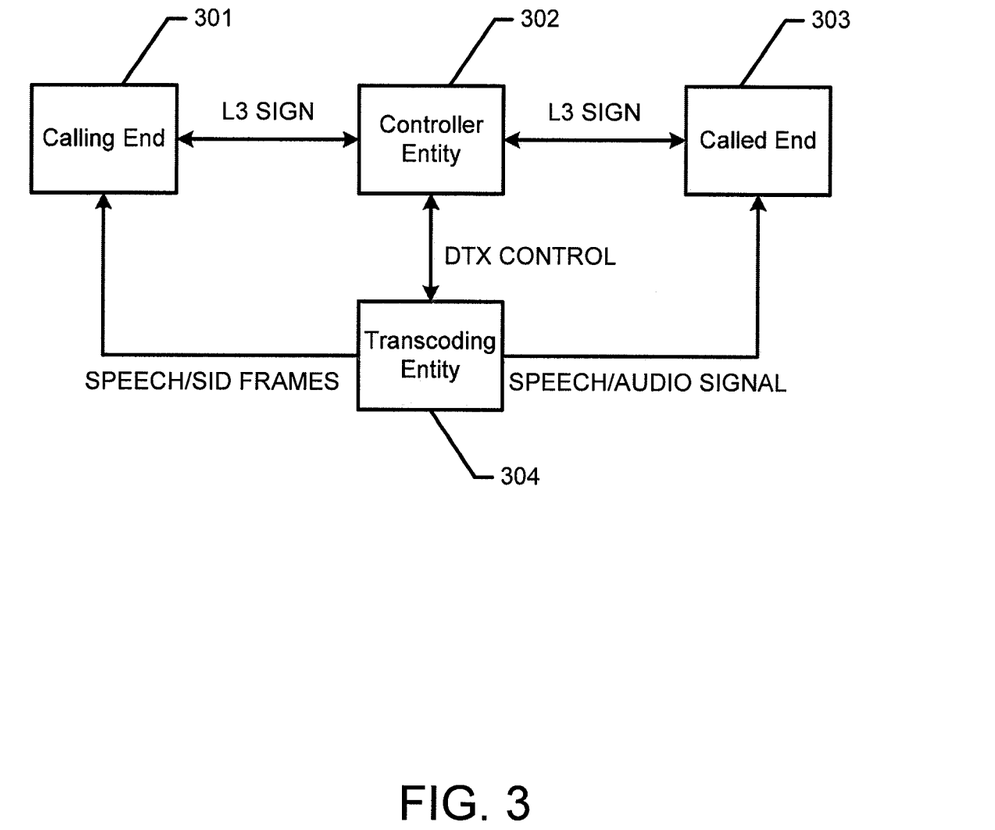
FIG. 3 is a diagram describing a generic system according to the present invention.

FIG. 3 illustrates an exemplary and generic block diagram describing the essential functional entities of the present invention. In the figure, the entities and the signalling between them are described only in the viewpoint of the DTX control functionality which is used for instance during the call establishment phase. In the figure there is described a calling end 301 and a called end 303. These ends 301 and 303 are in connection to the controller entity 302 with Layer 3 (L3) signalling messages sent between the entities. Transcoding entity 304 is located between calling end 301 and called end 303, and it is controlled by controller entity 302. Controller entity can be integrated to the BSC (see FIG. 2) or to the MSC Server (see FIG. 1) for disabling said discontinuous transmission functionality until the called end 303 answers and for enabling said discontinuous transmission functionality after the called end 303 has answered.

The detailed procedure and signalling of using the controller entity 302 is described later in reference to FIGS. 4 and 5. The controller entity 302 may be integrated to any network element that has an access to L3 signalling, and has a communication link that is able to provide DTX control information to the transcoding entity 304. The communication link may be a direct link to the transcoding entity (e.g. H.248 interface between the MSS and MGW), or there may be several interfaces and network elements between the controller and transcoding entities (e.g. L3 link over Abis interface from the BSC to BTS and TRAU link over Abis and Ater interfaces from the BTS to transcoder in the BSS having a remote transcoder concept). If the transcoder is integrated to the BSC, the DTX control information may be forwarded to the transcoder by using an internal communication link. Thus the controller entity 302 may locate in a different network element than the transcoding entity 304 or it may reside within the same network element, depending on the network architecture and chosen implementation.

Figure 4:
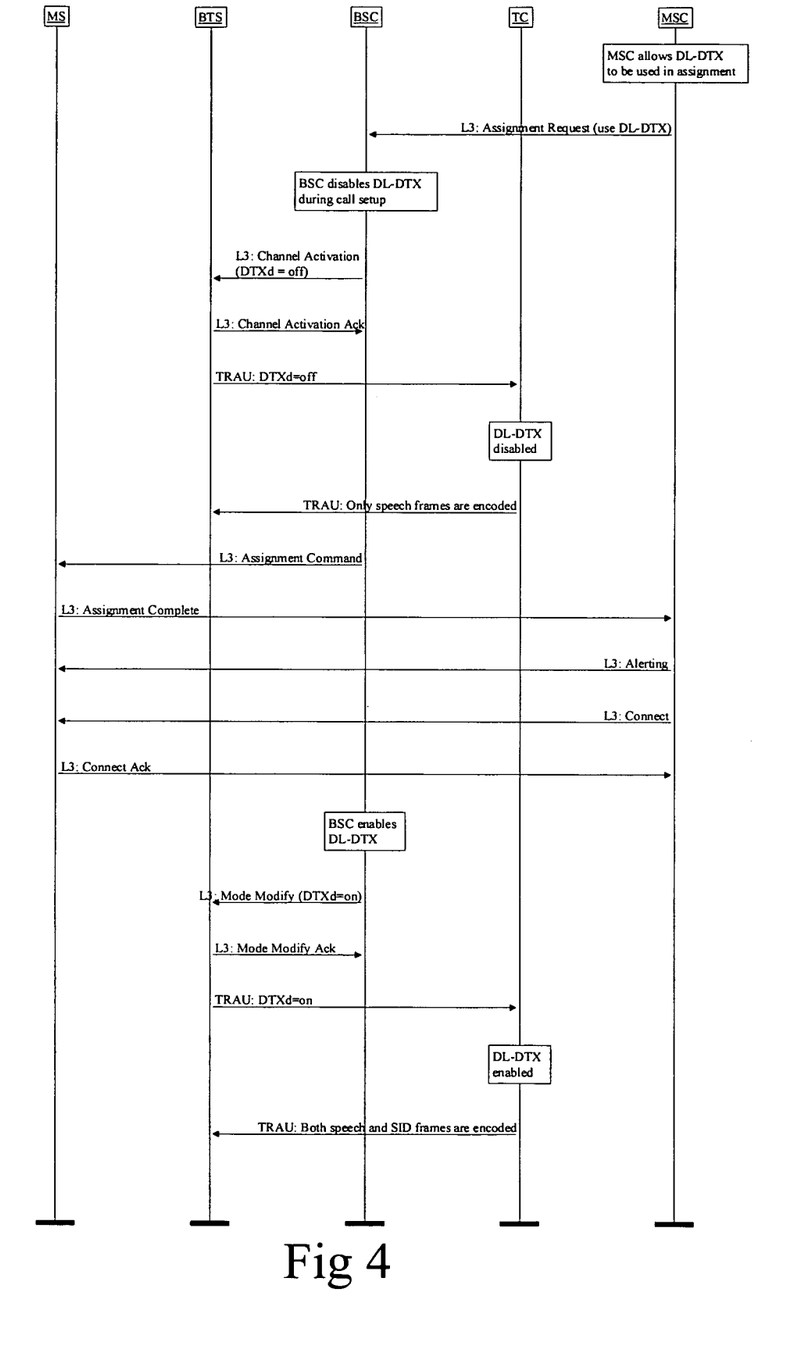
FIG. 4 presents a signalling diagram according to the first embodiment of the invention (BSS).

In FIG. 4 an implementation for the BSS is depicted as a signalling diagram. Out-band layer 3 call control between MSC, BSC, BTS and MS has been shown, as well as in-band TRAU frame control and status between the transcoder (TC) and BTS have been shown. Initial call setup (RACH/SDCCH phases) and irrelevant signalling messages have been omitted from the FIG. 4.

Once the mobile originated call has been progressed to the assignment request phase, the MSC sends Assignment Request message to the BSC. Because the operator has been activated downlink DTX for the particular BTS in the MSC, this message contains an information element that allows DL-DTX to be used for that connection. However as the BSC is using an implementation according to the invention, it neglects this received DTX status and overrides MSC's request for DL-DTX enabling, and thus it disables DL-DTX in this phase. Therefore the BSC sets DTXd flag to OFF state in a Channel Activation message and sends the message to the BTS. Once the BTS receives the Channel Activation message, it setups requested Air and Abis interface traffic channels and starts to send TRAU frames towards uplink with DTXd control bit set to OFF state. As soon as the BSC connects through TRAU frames to the Ater interface, the transcoder synchronizes to uplink TRAU frames. As the DTXd control bit is set to OFF, the TC starts to encode TRAU frames towards DL direction with DL-DTX disabled. Thereby all DL TRAU frames are speech frames and no SID frames are sent at all.

Once Abis/Ater traffic channels are established, the BSC commands the MS to use the allocated traffic channel by sending an Assignment Command message. As the MS has been tuned to the traffic channel it sends an Assignment Complete to the MSC. After that Alerting message is sent and inband ringing tone is started to send towards the MS via the MSC, TC, BSC and BTS. If the caller tunes feature is in use, music is sent instead of ringing tone. As the DL-DTX has been disabled, only speech frames are sent to mobile and music is always free from clipping and comfort noise artefacts.

Once the called subscriber answers to the incoming call, a Connect message is sent by the MSC to the MS via BSC and BTS. Although this message is sent transparently through the BSC, the BSC is able to monitor this message and its contents. The BSC can detect when the called subscriber has been answered either by monitoring Connect message in the DL direction or Connect Acknowledgement in the UL direction.

At this stage also the sending of ringing tone or caller tunes music is stopped. Therefore DL-DTX can be activated for the rest of call duration. In order to activate the DL-DTX during an active call, the BSC can use a mode modify procedure to alter properties of the active traffic channel. In this case the BSC sends a Mode Modify message with the DTXd flag to set ON to the BTS. As soon as the BTS receives this message, it changes DTXd control bit status to ON in UL TRAU frames. Thereby the TC activates DL-DTX in the DL direction as soon as it receives DTXd set to ON in UL TRAU frames. The TC encodes now DL TRAU frames as speech or SID frames depending on whether speech or pause/background noise is received from the A interface.

Figure 5A:
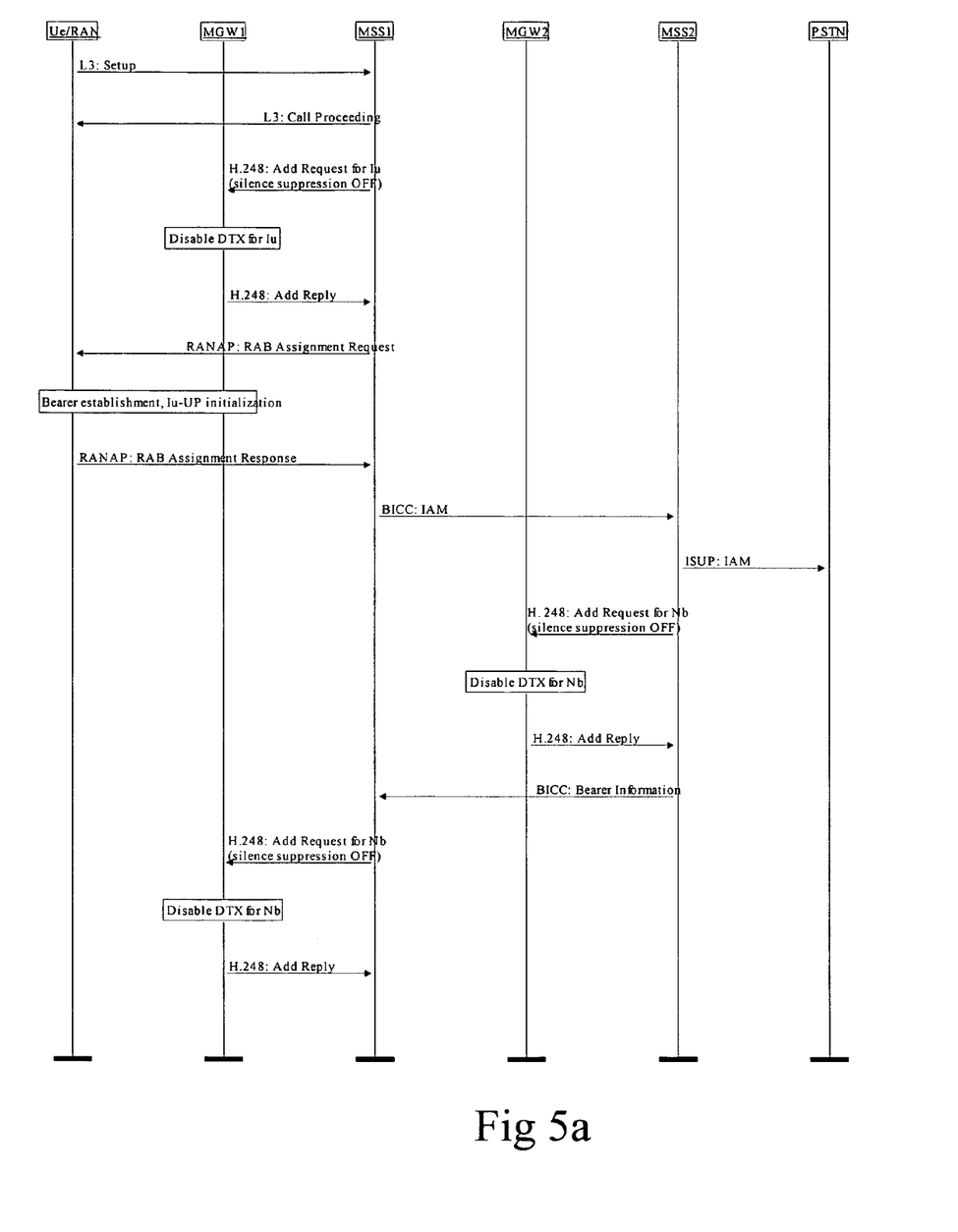
FIG. 5a presents a signalling diagram 1/2 according to the second embodiment of the invention (MSS).
Figure 5B:
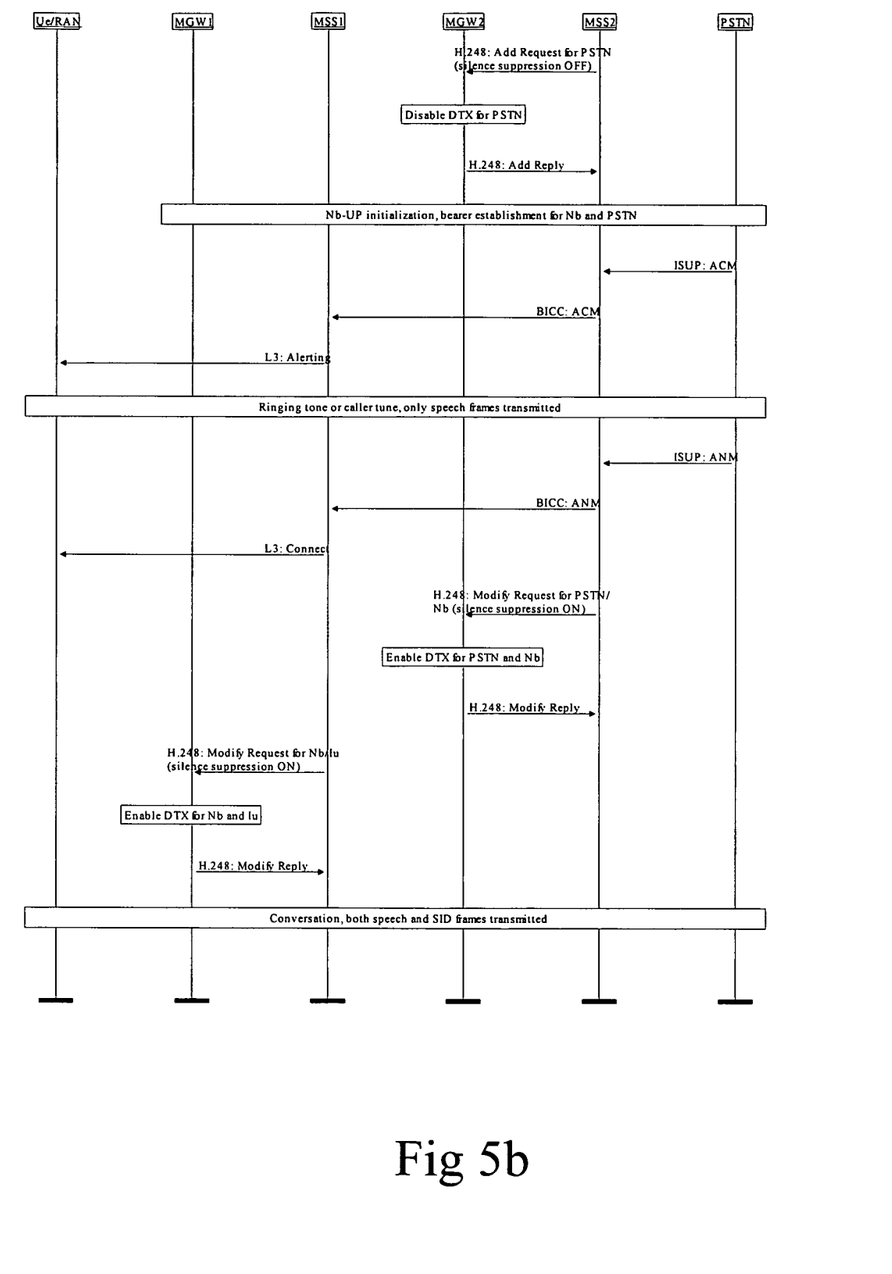
FIG. 5b presents a signalling diagram 2/2 according to the second embodiment of the invention (MSS).

FIG. 5 presents an implementation for the MSS release 4 system. This embodiment is not dependent on the used access network, if the transcoder and DTX functionality resides within the MGW, i.e. it could be used for WCDMA, IMS, FSS and UMA accesses. Note that for the GSM access, the first embodiment of the invention should be applied because G.711 codec used on the A interface does not have DTX functionality.

In FIG. 5 an example of the signalling sequence for a mobile originated call from 3G UE to PSTN is presented. 3GPP TS 23.205 specification shows some examples of mobile originated and terminated calls in the MSS environment. In FIG. 5, an early assignment procedure on the radio access side and a forward bearer establishment on the core network side have been presented. It should be noted that this is just one example and other call establishment procedures could be utilized as well, i.e. any combination of very early, early or late access bearer assignment and forward or backward bearer establishment. The signalling diagram shows the most essential Layer 3 (L3) messages on the RAN and MSS sides, H.248 messages between the MSS and MGW and ISUP messages in PSTN. Certain irrelevant L3 and H.248 messages from the invention point of view and lower layer messages have not been shown.

The basic idea of the invention applies also to this embodiment, i.e. DTX is enabled just after the called terminal has answered. In an MSS environment, a dynamic DTX control may be more complex than in the BSS environment because there may be several cascaded MSSs and MGWs in the speech path. Furthermore there may be cascaded speech transcodings in different MGWs. Finally the MSS may not know in which MGW and in which of its two terminations of the allocated context the actual transcoding is being carried out, and thus where the VAD/DTX functionality really resides.

Therefore it is important that the DTX control is distributed to all MGWs and all user plane interfaces (terminations of MGWs) in the speech path chain. In this example we have two MSSs and MGWs. Each MSS controls the DTX status of the MGW that it administrates. Initially before the called terminal answers, the DTX is disabled in both MGWs. Once the called terminal answers, the DTX is enabled in both MGWs.

The MSS can control the DTX status of MGW by utilizing H.248 messages ADD REQUEST or MODIFY REQUEST. It is possible to include a silence suppression control flag (PropertyID) into an H.248 message. This is presented in the annex C of H.248.1.

In the first phase of an early assignment procedure, a radio access bearer towards the RAN is established prior the core network side bearer establishment (FIG. 5a). This is done by preparing an Iu connection towards the RAN. This requires a resource allocation from the Iu interface of MGW1. This can be accomplished by sending an Add Request message to the MGW1. Within the Add Request message, the DTX is disabled by the silence suppression PropertyID. As soon as the Iu interface has been prepared within the MGW1, the actual access bearer is established by using an RAB assignment procedure (RANAP messages: RAB Assignment Request and RAB Assignment Response).

Once the access bearer has been setup, the bearers on the core network side are established. First the MSS1 sends an Initial Address Message (IAM) within the BICC protocol to the MSS2, and MSS2 forwards it towards PSTN as an ISUP message. Then, the MSS2 prepares bearer towards MGW1 in the MGW2 by sending an Add Request Message to the MGW2. Within the Add Request message, the DTX is disabled by the silence suppression PropertyID. The MSS2 returns a bearer address and a binding reference by sending a Bearer Information message to the MSS1. Based on this information, the MSS1 is able to establish a bearer towards the MGW2 by sending an Add Request Message to the MGW1. Within the Add Request message, the DTX is disabled by the silence suppression PropertyID. Now the bearer can be established on the Nb interface between the MGW1 and MGW2.

In FIG. 5b, the MSS2 first prepares a bearer towards the PSTN by sending Add Request Message to MGW2. Within the Add Request message, the DTX is disabled by the silence suppression PropertyID. Now the DTX is disabled in all terminations of both MGWs.

Finally once all bearers have been established in the PSTN, an Address Complete Message (ACM) is sent backwards to the MSS2 and then forwarded to MSS1. The ACM is converted to an Alert message towards the RAN by the MSS1. At the same time the ringing tone or caller tunes music is sent over the user plane channel from the local PSTN switch or from a caller tunes server and tone or music is heard from the mobile terminal. There will be no SID frames because the DTX functionality has been disabled for the whole speech processing chain, and thereby noise burst and music clipping problems can totally be avoided.

When the called subscriber answers, an Answer Message (ANM) is sent from PSTN to the MSS2 which the MSS2 forwards to the MSS1 and the MSS1 converts it to a Connect message towards the RAN. At this phase an end-to-end bi-directional speech path is connected in both MGWs and the ringing tone or caller tunes music is discontinued. When the MSS2 and MSS1 detect the ANM, they enable the DTX by sending Modify Request message to MGW2 and MGW1, respectively. Within the Modify Request message, the DTX is enabled by the silence suppression PropertyID. Now, the DTX in both MGWs are enabled and both speech and SID frames are sent to the mobile terminal depending on the speech activity status. Note that the same messages are used for modifying the topology of speech path connections to bi-directional type. This means that no additional H.248 messages are needed for DTX enabling.

It is obvious to a person skilled in the art that with the advancement of technology, the basic idea of the invention may be implemented in various ways. The invention and its embodiments are thus not limited to the examples described above; instead they may vary within the scope of the claims.

What is claimed is:

1. A method comprising:
    disabling a discontinuous transmission functionality controlling a transmission of silence description frames until a moment of answer of a called terminal;
    providing for detection of a moment of answer of the called terminal from signaling of a call setup procedure;
    enabling said discontinuous transmission functionality in response to providing for detection of the moment of answer of the called terminal; and
    adding disablement information to the signaling of the call setup procedure to enable one or more network entities to receive information that the discontinuous transmission functionality is disabled.

2. The method according to claim 1, further comprising:
    interrupting the transmission of said silence description frames until said discontinuous transmission functionality is enabled.

3. The method according to claim 1, further comprising:
    providing said discontinuous transmission functionality in a speech codec.

4. The method according to claim 1, further comprising:
    forwarding a status of call progress to a controller which controls a network transcoding entity.

5. The method according to claim 1, further comprising:
    accomplishing the disabling of said discontinuous transmission functionality by neglecting discontinuous transmission status information and overriding a request for discontinuous transmission enabling in the call setup procedure.

6. The method according to claim 1, further comprising:
    accomplishing the enabling of said discontinuous transmission functionality by providing for detection of the moment of answer of the called terminal from an appropriate signaling message.

7. The method according to claim 1, further comprising:
    accomplishing the enabling of said discontinuous transmission functionality by providing for detection of the moment of answer of the called terminal from an answer message sent from a first network entity to a second network entity.

8. An apparatus configured to:
    disable a discontinuous transmission functionality controlling a transmission of silence description frames until a moment of answer of a called terminal;
    enable said discontinuous transmission functionality in response to providing for detection of the moment of answer of the called terminal from signaling of a call setup procedure; and
    add disablement information to the signaling of the call setup procedure to enable one or more network entities to receive information that the discontinuous transmission functionality is disabled.

9. The apparatus according to claim 8, wherein the apparatus is provided in a speech codec.

10. The apparatus according to claim 8, wherein the apparatus is further configured to forward a status of call progress to a network transcoder entity controller.

11. The apparatus according to claim 8, wherein the apparatus is further configured to neglect discontinuous transmission status information and override a request for discontinuous transmission enabling in the call setup procedure.

12. The apparatus according to claim 8, wherein the apparatus is further configured to provide for detection of the moment of answer of the called terminal from an appropriate signaling message.

13. The apparatus according to claim 8, wherein the apparatus is further configured to provide for detection of the moment of answer of the called terminal from an answer message sent from a first network entity to a second network entity.

14. An apparatus comprising:
- means for disabling a discontinuous transmission functionality controlling transmission of silence description frames until a moment of answer of a called terminal;
- means for enabling said discontinuous transmission functionality in response to providing for detection of the moment of answer of the called terminal; and
- means for adding disablement information to the signaling of the call setup procedure to enable one or more network entities to receive information that the discontinuous transmission functionality is disabled.

15. A computer program product embodied on a non-transitory computer readable medium, the computer program controlling a data-processing device to:
- disable a discontinuous transmission functionality controlling a transmission of silence description frames until a moment of answer of a called terminal;
- provide for detection of the moment of answer of the called terminal from signaling of a call setup procedure;
- enable said discontinuous transmission functionality in response to providing for detection of the moment of answer of the called terminal; and
- add disablement information to the signaling of the call setup procedure to enable one or more network entities to receive information that the discontinuous transmission functionality is disabled.

* * * * *